(12) United States Patent
Payne, III et al.

(10) Patent No.: US 7,471,733 B1
(45) Date of Patent: Dec. 30, 2008

(54) DIGITAL TRANSMISSION OF BROADCAST SIGNALS, INCLUDING HDTV SIGNALS, OVER A MICROWAVE LINK

(75) Inventors: John B. Payne, III, Hackettstown, NJ (US); John B. Payne, IV, Newton, NJ (US)

(73) Assignee: Nucomm, Inc., Hackettstown, NJ (US)

( * ) Notice: Subject to any disclaimer, the term of this patent is extended or adjusted under 35 U.S.C. 154(b) by 0 days.

(21) Appl. No.: 11/888,626

(22) Filed: Aug. 1, 2007

Related U.S. Application Data

(62) Division of application No. 10/818,041, filed on Apr. 5, 2004.

(60) Provisional application No. 60/460,264, filed on Apr. 4, 2003.

(51) Int. Cl.
*H04L 25/34* (2006.01)

(52) U.S. Cl. ...................................... 375/286

(58) Field of Classification Search ................ 375/242, 375/286, 295, 301; 370/395.64; 348/571, 348/572, 575, 584, 589
See application file for complete search history.

(56) References Cited

U.S. PATENT DOCUMENTS

| | | | |
|---|---|---|---|
| 4,535,352 A | 8/1985 | Haskell | |
| 5,541,955 A | 7/1996 | Jacobsmeyer | |
| 5,581,575 A | 12/1996 | Zehavi | |
| 5,602,595 A | 2/1997 | Citta et al. | |
| 5,841,806 A | 11/1998 | Gilhousen | |
| 5,903,775 A | 5/1999 | Murray | |
| 6,002,722 A | 12/1999 | Wu | |
| 6,026,097 A | 2/2000 | Voois | |
| 6,055,268 A | 4/2000 | Timm | |
| 6,163,681 A | 12/2000 | Wright | |
| 6,377,314 B1 | 4/2002 | Collins et al. | |
| 6,404,776 B1 | 6/2002 | Voois | |
| 6,421,336 B1 | 7/2002 | Proctor | |
| 6,496,504 B1 | 12/2002 | Malik | |
| 6,661,975 B1 | 12/2003 | Hall | |
| 6,724,441 B2 | 4/2004 | Choi et al. | |
| 6,738,102 B1 | 5/2004 | Park et al. | |

(Continued)

OTHER PUBLICATIONS

Advanced Television Systems Committee, Annex D, RF/Transmission Systems Characteristics, Industry Standard, Sep. 16, 1995.

(Continued)

*Primary Examiner*—Sam K Ahn
(74) *Attorney, Agent, or Firm*—Lerner, David, Littenberg, Krumholz & Mentlik, LLP

(57) ABSTRACT

Methods and apparatus are provided for the provision of high definition television services over an analog or digital broadcast infrastructure. In one aspect, the present invention provides a method for transmitting a plurality of digital data streams over an analog microwave link comprising multiplexing the digital data streams, converting the multiplexed data stream into an analog baseband signal and transmitting the baseband signal along with an analog sub-carrier over an analog broadcast network. In another aspect, an apparatus for performing the method is provided. In a further aspect, a method and apparatus for preparing digital data for transmission over a microwave link comprises the step of, or structure for, multiplexing a plurality of digital data streams, encoding the multiplexed digital data stream to form a multi-level signal and combining the multilevel signal with one or more sub-carrier signals to form a radio frequency signal.

8 Claims, 16 Drawing Sheets

U.S. PATENT DOCUMENTS

2003/0048856 A1* 3/2003 Ketchum et al. ............ 375/260
2004/0101046 A1   5/2004 Yang et al.

OTHER PUBLICATIONS

Advanced Television Systems Committee, ATSC VSB Transmission: The Right Choice for U.S. DTV Broadcasters, Online Journal, Jul. 2, 1999.

Axcera, LLC, Distributed Transmission Technology, on-line web article, Mar. 12, 2003.

Lucent Technologies, Lucent Digital Video ammounces DVB-ASI support for MPEG-2 encoder; ideal for global cable systems, press release, Dec. 2, 1998, www.lucent.com/press/1298/981202.cob.html.

Nucomm, "Nucomm Earns TV Technology's Star 2001 Award for Revolutionary New Analog Coder at NAB: Proprietary New Technology Allows Transmission of DTV Signal Plus a T1 Data Pack Over Existing Analog Radios", May 2001.

Nucomm, "Nucomm Introduces the Analog Coder: Revolutionary New Technology Allows Transmission of DTV Signal Plus a T1 Data Pack Over Existing Analog Radios", Apr. 2001.

Nucomm, 'Analog Coder: Digital over an Analog Link Modulator/Demodulator Converts existing Analog STL to a Digital STL', Nucomm product guide, Apr. 2001.

Nucomm, Nucomm Announces Major Upgrade of the Analog Coder Nucomm Microwave Solutions For The Digital Age, Feb. 26, 2003.

S. Sastry, MIT Media Lab, Pulse Modulation Schemes, web page, Apr. 20, 1997, www.media.mit.edu/physics/pedagogy/fab/fab_2002/help_pages.

Sparano, David "What Exactly Is 8-VSB Anyway?" Third edition of an article that orignally appeared in 1997. Previous editions have appeared on the Harris Broadcast website and the Miller Freeman Guide to Digital Television, 1997.

Yener, Summary Of Amplitude Modulation, on-line web course, date-unknown, website unknown.

Zenith Electronics, ATSC Re-Modulator 221-1413, Preliminary, Apr. 1999.

Zenith Electronics, ATSC VSB Re-Modulator System, Specification, Jan. 4, 1999.

Zenith Electronics, Inc., Re-Modulator ASIC Evaluation PCB, Specifications, Mar. 20, 2000.

* cited by examiner

FIG. 1

| Modulation System | Code Rate | Guard Interval | | | |
|---|---|---|---|---|---|
| | | 1/32 | 1/16 | 1/8 | 1/4 |
| IF = 9.142857 MHz | | Flo = 60.857143 MHz | | BW = 8 MHz | |
| Clk=36.571429 Mbit/s | | Data Rate (Mbit/s) | | | |
| QPSK | 1/2 | 6.032086 | 5.854671 | 5.529412 | 4.976471 |
| | 2/3 | 8.042781 | 7.806228 | 7.372549 | 6.635294 |
| | 3/4 | 9.048128 | 8.782007 | 8.294118 | 7.464706 |
| | 5/6 | 10.053476 | 9.757785 | 9.215686 | 8.294118 |
| | 7/8 | 10.55615 | 10.24568 | 9.676471 | 8.708824 |
| 16-QAM | 1/2 | 12.064172 | 11.70934 | 11.05882 | 9.952942 |
| | 2/3 | 16.085562 | 15.61246 | 14.7451 | 13.27059 |
| | 3/4 | 18.096256 | 17.56401 | 16.58824 | 14.92941 |
| | 5/6 | 20.106952 | 19.51557 | 18.43137 | 16.58824 |
| | 7/8 | 21.1123 | 20.49135 | 19.35294 | 17.41765 |
| 64-QAM | 1/2 | 18.096258 | 17.56401 | 16.58824 | 14.92941 |
| | 2/3 | 24.128343 | 23.41868 | 22.11765 | 19.90588 |
| | 3/4 | 27.144384 | 26.34602 | 24.88235 | 22.39412 |
| | 5/6 | 30.160428 | 29.27336 | 27.64706 | 24.88235 |
| | 7/8 | 31.66845 | 30.73703 | 29.02941 | 26.12647 |

| Modulation System | Code Rate | Guard Interval | | | |
|---|---|---|---|---|---|
| | | 1/32 | 1/16 | 1/8 | 1/4 |
| IF = 7.999999875 MHz | | Flo = 62.000000125 MHz | | BW = 7 MHz | |
| Clk=32.0000 Mbit/s | | Data Rate (Mbit/s) | | | |
| QPSK | 1/2 | 5.27807525 | 5.12283713 | 4.8382355 | 4.354412125 |
| | 2/3 | 7.03743338 | 6.8304495 | 6.4509804 | 5.80588225 |
| | 3/4 | 7.917112 | 7.68425613 | 7.2573533 | 6.53161775 |
| | 5/6 | 8.7967915 | 8.53806188 | 8.0637253 | 7.25735325 |
| | 7/8 | 9.23663125 | 8.96496563 | 8.4669121 | 7.620221 |
| 16-QAM | 1/2 | 10.5561505 | 10.2456743 | 9.676471 | 8.70882425 |
| | 2/3 | 14.0748668 | 13.660899 | 12.901961 | 11.6117645 |
| | 3/4 | 15.834224 | 15.3685123 | 14.514707 | 13.0632355 |
| | 5/6 | 17.593583 | 17.0761238 | 16.127451 | 14.5147065 |
| | 7/8 | 18.4732625 | 17.9299313 | 16.933824 | 15.240442 |
| 64-QAM | 1/2 | 15.8342258 | 15.3685114 | 14.514707 | 13.06323638 |
| | 2/3 | 21.1123001 | 20.4913485 | 19.352941 | 17.41764675 |
| | 3/4 | 23.751336 | 23.0527684 | 21.77206 | 19.59485325 |
| | 5/6 | 26.3903745 | 25.6141856 | 24.191176 | 21.77205975 |
| | 7/8 | 27.7098938 | 26.8948969 | 25.400736 | 22.860663 |

| Modulation System | Code Rate | Guard Interval | | | |
|---|---|---|---|---|---|
| | | 1/32 | 1/16 | 1/8 | 1/4 |
| IF = 6.85714275 MHz | | Flo = 63.14285725 MHz | | BW = 6 MHz | |
| Clk=27.428571 Mbit/s | | Data Rate (Mbit/s) | | | |
| QPSK | 1/2 | 4.5240645 | 4.391003 | 4.147059 | 3.732353 |
| | 2/3 | 6.0320858 | 5.854671 | 5.529412 | 4.976471 |
| | 3/4 | 6.786096 | 6.586505 | 6.220589 | 5.59853 |
| | 5/6 | 7.540107 | 7.318339 | 6.911765 | 6.220589 |
| | 7/8 | 7.9171125 | 7.684256 | 7.257353 | 6.531618 |
| 16-QAM | 1/2 | 9.048129 | 8.782007 | 8.294118 | 7.464707 |
| | 2/3 | 12.064172 | 11.70934 | 11.05882 | 9.952941 |
| | 3/4 | 13.572192 | 13.17301 | 12.44118 | 11.19706 |
| | 5/6 | 15.080214 | 14.63668 | 13.82353 | 12.44118 |
| | 7/8 | 15.834225 | 15.36851 | 14.51471 | 13.06324 |
| 64-QAM | 1/2 | 13.572194 | 13.17301 | 12.44118 | 11.19706 |
| | 2/3 | 18.096257 | 17.56401 | 16.58824 | 14.92941 |
| | 3/4 | 20.358288 | 19.75952 | 18.66176 | 16.79559 |
| | 5/6 | 22.620321 | 21.95502 | 20.73529 | 18.66177 |
| | 7/8 | 23.751338 | 23.05277 | 21.77206 | 19.59485 |

| Modulation System | Code Rate | Guard Interval | | | |
|---|---|---|---|---|---|
| | | 1/32 | 1/16 | 1/8 | 1/4 |
| IF = 13.7142855 MHz | | Flo = 56.2857145 MHz | | BW = 10 MHz | |
| Clk = 54.8571435 Mbit/s | | Data Rate (Mbit/s) | | | |
| QPSK | 1/2 | 7.5401075 | 7.31833875 | 6.911765 | 6.22058875 |
| | 2/3 | 10.0534763 | 9.757785 | 9.2156863 | 8.2941175 |
| | 3/4 | 11.31016 | 10.9775088 | 10.367648 | 9.3308825 |
| | 5/6 | 12.566845 | 12.1972313 | 11.519608 | 10.3676475 |
| | 7/8 | 13.1951875 | 12.8070938 | 12.095589 | 10.88603 |
| 16-QAM | 1/2 | 15.080215 | 14.6366775 | 13.82353 | 12.4411775 |
| | 2/3 | 20.1069525 | 19.51557 | 18.431373 | 16.588235 |
| | 3/4 | 22.62032 | 21.9550175 | 20.735295 | 18.661765 |
| | 5/6 | 25.13369 | 24.3944625 | 23.039215 | 20.735295 |
| | 7/8 | 26.390375 | 25.6141875 | 24.191178 | 21.77206 |
| 64-QAM | 1/2 | 22.6203225 | 21.9550163 | 20.735295 | 18.66176625 |
| | 2/3 | 30.1604288 | 29.273355 | 27.647059 | 24.8823525 |
| | 3/4 | 33.93048 | 32.9325263 | 31.102943 | 27.9926475 |
| | 5/6 | 37.700535 | 36.5916938 | 34.558823 | 31.1029425 |
| | 7/8 | 39.5855625 | 38.4212813 | 36.286756 | 32.65809 |

FIG. 1

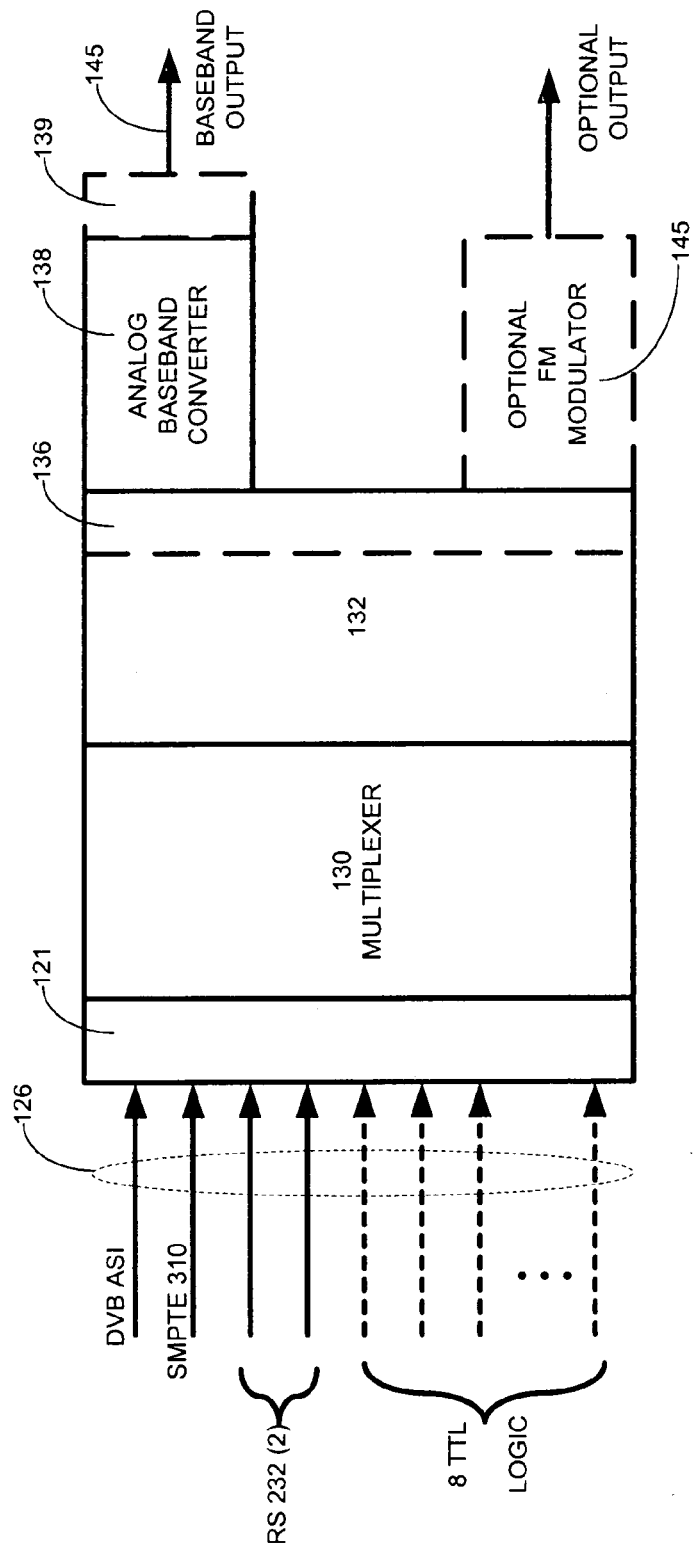

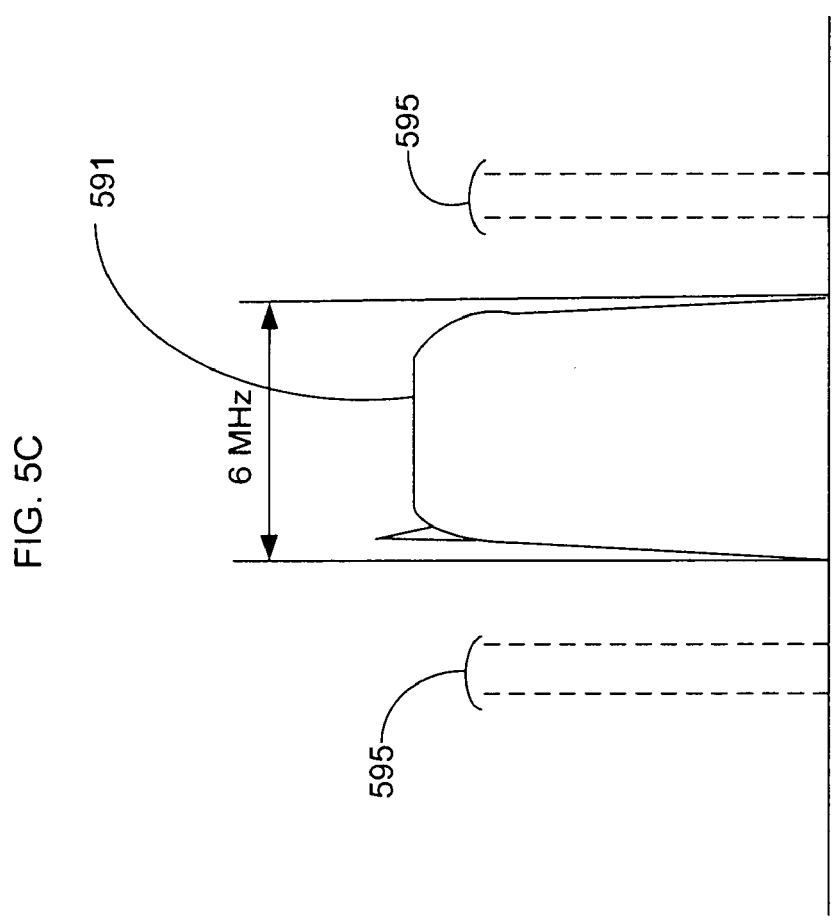

DIGITAL TRANSMISSION OF BROADCAST SIGNALS, INCLUDING HDTV SIGNALS, OVER A MICROWAVE LINK

CROSS-REFERENCE TO RELATED APPLICATIONS

This application is a divisional of U.S. application Ser. No. 10/818,041, filed on Apr. 5, 2004, which claims the benefit of U.S. Provisional Patent Application No. 60/460,264, which was filed on Apr. 4, 2003 and entitled "Digital Transmission of Broadcast Signals Over an Analog Microwave Link," the disclosure of which is incorporated by reference herein in its entirety.

BACKGROUND

The present invention relates to systems and methods used in the transmission of television signals, in particular high definition and/or digital video signals.

There are perhaps only a few inventions of the past century that are more significant than broadcast television. It played and continues to play an important role in capturing historical events, shaping the mores of modern society and making the world a smaller place.

Despite the role it plays in today's society, current television systems primarily reside and depend on an analog platform, e.g., end user television sets, microwave transmitters and receivers that send and receive broadcasts, etc. In fact, the broadcast television network primarily relies on analog technology to get signals to users as it did over fifty years ago when the television set was first invented.

During this time period, however, the development of digital technology has spawned a new information age. Recognizing the present and future import of digital technology, various players within and without the television industry, including governmental agencies, equipment and component manufacturers, broadcasts, cable providers, etc., came together to formulate a new standard for the provision of digital television as a service. This effort resulted in what is colloquially referred to as high definition television (HDTV).

In 1996, the U.S. Federal Communications Commission (FCC) formally adopted a standard for HDTV. To date, however, HDTV services have not seen widespread deployment and use, neither in the U.S. nor internationally. Several economic and business factors have affected the deployment of HDTV. One such factor has been the availability of end user devices, such as HDTV sets. Until recently, HDTV sets were not readily available at a price within the reach of most individuals. Furthermore, even though HDTV sets are making their way into the marketplace, an additional obstacle to widespread deployment and use is and will be upgrading the analog broadcast network to a digital network. The capital investment or costs associated with replacing or upgrading the analog broadcast network with a digital network are tremendous. These costs have contributed to delaying the availability of HDTV services. In fact, the widespread deployment of and ultimate switch to HDTV will continue to be delayed, especially at small to mid-market affiliates and independent stations, until a cost-effective solution to completing a digital upgrade is available. For example, the Public Broadcasting System (PBS) broadcasts its signals to many localities via multi-hop links. The costs associated with replacing the equipment in each locality is prohibitive for independent stations such as PBS. In addition, some end-users may delay purchasing HDTV sets until a majority of the programming received is in a digital format. Thus, there are advantages to not deploying HDTV services piecemeal. As such, a solution that allows for the provision of HDTV service without completely replacing the analog equipment already in the network is needed.

In addition, in 1997 the FCC mandated in ET Docket 95-18, that the 2 GHz frequency band used by U.S. broadcasters for ENG (Electronic News Gathering), defined as BAS (Broadcast Auxiliary Services) in part 74 of the FCC regulations, must be changed by a date to be determined. A final order was issued on Nov. 5, 2003 as FCC 03-280. The final order changes the 2 GHz BAS band from 7 channels with each occupying a 17 MHz bandwidth (one channel is 18 MHz) to 7 channels with each occupying a 12 MHz bandwidth.

In the past, ENG broadcasters have used FM Analog modulation for transmission of video with up to four audio signals within these seven 17 MHz wide 2 GHz channels. Analog modulation as used by the broadcasters requires the full 17 MHz of channel bandwidth. With the channel bandwidth reduced to 12 MHz, the quality of the video and audio signals transmitted may be degraded. Furthermore, adjacent channel interference will be increased. Moreover, the number of audio channels will be reduced to only two with the second audio channel being extremely susceptible to adjacent channel interference.

The changes mandated by the FCC may force most ENG operators to turn to digital modulation. This will require replacing their analog transmitting and receiving equipment with digital equipment. The estimated cost per transmitter is about $45,000 while the estimated cost per receiver is approximately $25,000. The transmitter cost is divided between two pieces of equipment; a digital transmitter (capable of both analog and digital operation) and a digital modulator that produces a COFDM (coded orthogonal frequency division multiplexing) digital signal. The costs are usually apportioned as follows: transmitter—$20,000 and modulator—$25,000. The receiver essentially consists of two parts, the receiver and the COFDM demodulator. The costs associated with the receiver are usually apportioned as follows: receiver—$13,000 and demodulator—$6,500. In addition, the receiver also includes miscellaneous equipment, which costs approximately $5,500. Such miscellaneous equipment may include for example, a block down converter, low noise amplifier and other ancillary equipment.

It has been estimated that approximately 20,000 such transmitters and 6,000 receivers will need to be replaced. The digital modulation of choice for the ENG application is COFDM with a modulation selectable format of QPSK (quadrature phase shift keying), 16-QAM (quadrature amplitude modulation) and 64-QAM. QPSK is the primary format used with a code rate FEC (forward error correction) of ½, a guard interval of ⅛ or ¹⁄₃₂ and an adjustable bandwidth of 8 MHz. The bandwidth can be switched between 6, 7 or 8 MHz. COFDM is a robust form of digital transmission and works well in a multi-path environment. It is particularly robust in mobile applications such as moving vehicles and helicopters. FIG. 1 shows the trade-offs of data rates for COFDM between formats, code rates, guard interval and bandwidth. COFDM is preferable because of its multipath performance. On the other hand, the overall data rate of COFDM is relatively low as compared to other modulation formats such as single carrier VSB (Vestigial Side-Band) or QAM.

A measure of data rate or information that can be transmitted through a channel or system can be expressed in terms of bits/Hz. That is:

$$\text{Bits/HZ} = \text{Data Rate/Bandwidth}.$$

The maximum data rate that can be transmitted using COFDM with the QPSK format is 6.03 Mb/s within an 8 MHz bandwidth (6/8=0.75 bits/Hz). Many users actually operate at 5.53 Mb/s (0.69 bits/Hz). Using a less rugged format of 16 QAM, a code rate of ½ and a bandwidth of 8 MHz, the maximum data rate is 12.06 Mb/s (1.5 bits/Hz). When the bandwidth of the 8 MHz COFDM signal is reduced to 6 MHz, the data rate capacity is reduced by ⅝ or ¾. The bits/Hz, however, is reduced to 0.56 bits/Hz. As such, COFDM will limit the performance of ENG systems operating within the newly prepared FCC bandwidth limitations.

ATSC (Advanced Television Systems Committee) 8-VSB modulation (generically referred to as VSB—see Table 1) is the method adopted and used today in the U.S. to transmit High Definition TV (HDTV) to the home. The ATSC VSB modulation standard defines five modulations formats for transmitting digital data at various data rates as is shown in Table 1. In one format Trellis coding ("T") is used with an 8-VSB formatted signal, designated 8-VSBT, by selecting two data bits at a time and adding a third bit to the two bits selected to form a three-bit word. Each three-bit word is then used to generate a symbol. Without Trellis coding the signal is not as robust and requires a stronger signal level at the receiver for error correction. Using the standard ATSC 8-VSBT format for modulation, 19.39 Mb/s of data can be transmitted in a 6 MHz bandwidth (19.39/6=3.23 bits/Hz). 8-VSBT is generally regarded as being more spectral efficient, more robust, relatively inexpensive to implement and allows for the transmission of a relatively larger amount of data to be transmitted in the same bandwidth (3.23 bits/Hz for COFDM in a 6 MHz bandwidth).

TABLE 1

ATSC VSB Formats Versus Data Rates 1. 2-VSB = 9.696 Mbps (No Trellis Coding)
2. 4-VSB = 19.393 Mbps (No Trellis Coding)
3. 8-VSBT = 19.393 Mbps (Uses Trellis Coding)
4. 8-VSB = 29.089 Mbps (No Trellis Coding)
5. 16-VSB = 38.785 Mbps (No Trellis Coding)

Of utility then are methods, apparatus and systems that offer a reduction in the capital investment associated with upgrading the broadcast network to a digital network and ultimately providing HDTV service. Of utility also are methods and apparatus that facilitate provision of electronic news gathering in accordance with the more restrictive bandwidth requirements mandated by the FCC, while delivering the level of performance to which the ENG community is accustomed.

SUMMARY

In one aspect the present invention is a method for preparing digital data for transmission over an analog microwave network. The method comprises multiplexing a plurality of input digital data signals to form a multiplexed input digital data signal, encoding the multiplexed input digital data signal to form a multilevel signal and filtering the multilevel signal. The filtered signal is then converted into an analog baseband signal having a limited passband and that is compatible with the input of an analog microwave transmitter. The analog baseband signal preferably along with at least one analog sub-carrier signal is then used to frequency modulate a carrier signal to produce a radio frequency signal compatible with the analog microwave network.

Further in accordance with this aspect of the present invention, filtering the multilevel signal comprises filtering using a digital low-pass filter having a 3-dB cutoff at approximately ½ the rate of the multilevel signal. Most preferably, the digital low-pass filter has a 3-dB cutoff around six mega-hertz.

The method may also further comprise adding a forward error correction code to the multiplexed input digital data signal during the encoding step.

Further in accordance with this aspect of the present invention, multiplexing the plurality of digital data inputs preferably includes combining digital data with a variable data stream having a bit rate between one and thirty megabits per second.

Further in accordance with this aspect of the present invention, the multiplexing further comprises encoding at least one digital video signal. Most preferably, the at least one digital video signal may be encoded in accordance either the MPEG-2, MPEG-4 or wavelet digital video formats.

Encoding in accordance with the method may further desirably comprise forming a multilevel signal compatible with a signal format selected from the group consisting of a 2-level, 4-level, 8-level and 16-level signal.

Further in accordance with the method, frequency modulating most desirably includes modulating an audio signal onto to one of said at least one sub-carrier signal.

In another aspect of the present invention, an apparatus for preparing digital data for transmission over an analog microwave link is provided. The apparatus preferably includes at least one input port, an output port and a multiplexer coupled to the at least one input port for combining digital signals present on the input ports to produce a multiplexed signal. It is further desirable that the apparatus also includes an encoder coupled to the multiplexer, the encoder being operable to encode the multiplexed signal into a multilevel signal, an analog baseband converter coupled to the encoder for converting the multilevel signal into a baseband output signal and a frequency modulator operable to frequency modulate a carrier signal with the baseband output signal to produce a radio frequency signal on the output port that is compatible with the analog microwave link.

Further in accordance with this aspect of the present invention, the frequency modulator further includes a plurality of input ports. A first of the plurality of input ports is preferably coupled to the converter and a second of the plurality of input ports is preferably coupled to a subcarrier signal. In addition, the frequency modulator preferably frequency modulates the signals appearing at the plurality of input ports to produce the radio frequency signal that is compatible with the analog microwave link.

Further still in accordance with this aspect of the present invention, the sub-carrier signal may desirably comprise an audio signal, a signal encoded with sub-titles, closed-captioned text, remote monitoring or control.

Further in accordance with this aspect of the present invention, the encoder is operable to encode the multiplexed signals to produce a multi-level signal compatible with a signal format selected from the group consisting of a 2-level, 4-level, 8-level and 16-level signal. The multiplexer is most desirably a packet multiplexer.

It is further desirable that the digital signals present on the at least one input port includes a digital video signal encoded in accordance with a format selected from the group consisting of the MPEG-2, MPEG-4 and wavelet format.

In accordance with yet another aspect of the present invention, a method for preparing digital data for transmission over a microwave link is provided. In accordance with this aspect, the method preferably comprises multiplexing one or more digital data signals to form a digital transport stream, encoding the digital transport stream to form a multilevel digital data signal, processing the multilevel digital data signal to form an intermediate frequency signal and combining the intermediate frequency output signal with one or more sub-carrier signals to form a radio frequency output signal having a band-limited frequency spectrum that occupies a 12 MHz or 25 MHz bandwidth. Most preferably, the microwave link is a digital or heterodyne microwave link.

In accordance with this aspect of the present invention, the method further comprises selecting a multilevel signal parameter and encoding the digital transport stream based on the multilevel signal parameter. Most preferably, the multilevel signal parameter is user selectable.

Further in accordance with this method aspect of the present invention, encoding comprises encoding the digital transport stream to form a 2 level signal compatible with the 2-VSB format. In addition, encoding may also include encoding the digital transport stream to form a 4 level signal compatible with either the 4-VSB format, 8-VSB or 16-VSB formats.

Most preferably, combining comprises mixing the intermediate frequency signal with the one or more sub-carrier signals to produce a first signal and filtering the first signal so that the one or more sub-carrier signals symmetrically occupy frequency bands on both sides of the intermediate frequency output signal within the 12 MHz bandwidth.

In accordance with additional aspects of the present invention, an apparatus for preparing digital data for transmission over a digital microwave link is provided. Most preferably, the apparatus comprises a multiplexer operable to multiplex one or more digital data signals to form a digital transport stream; an encoder operable to encode the digital transport stream to form a multilevel digital data signal; a modulator operable to modulate the multilevel digital data signal to produce an intermediate frequency signal; a band-pass filter for limiting the band-pass of the intermediate frequency output signal; and a combiner operable to combine the intermediate frequency output signal with one or more sub-carrier signals to form a radio frequency output signal having a band-limited frequency spectrum that occupies a 12 MHz or 25 MHz bandwidth.

In yet still another aspect, the present invention includes a method for transmitting a digital signal over a microwave link. The method desirably comprises demultiplexing a digital data stream into a plurality of lower data rate streams, modulating each of the demultiplexed lower data rate streams to produce a plurality of VSB signal streams and combining each of the multilevel signal streams into a combined intermediate frequency signal. The method further desirably includes transmitting the combined intermediate frequency signal over the microwave link.

The method may further desirably include modulating each of the demultiplexed lower data rate signals to produce a VSB signal consistent with either a 2-VSB, 4-VSB, 8-VSB or 16 VSB format.

Most preferably, each of the plurality of VSB signal streams are generated at a different predetermined frequency.

In another aspect, the present invention further includes an apparatus for transmitting a digital signal over a microwave link. The apparatus preferably comprises a demultiplexer having an input and a plurality of outputs; a plurality of VSB modulators, each of said VSB modulators having an input coupled to respective ones of said demultiplexer outputs and a plurality of outputs corresponding to respective ones of said VSB modulator inputs; an intermediate frequency combiner for combining each of said VSB modulator outputs into a transport stream; and a digital microwave radio for transmitting said transport stream over the microwave link.

These and other aspects of the present invention are set forth in the drawings and detailed descriptions as is set forth below.

BRIEF DESCRIPTION OF THE DRAWINGS

FIG. 1 shows trade-offs between COFDM data rate and bandwidth;

FIG. 2 depicts an illustrative embodiment of an apparatus in accordance with an aspect of the present invention;

FIG. 5C is an illustrative plot of the spectrum of a signal prepared in accordance with the apparatus of FIG. 5A.

DETAILED DESCRIPTION

Figure 3:
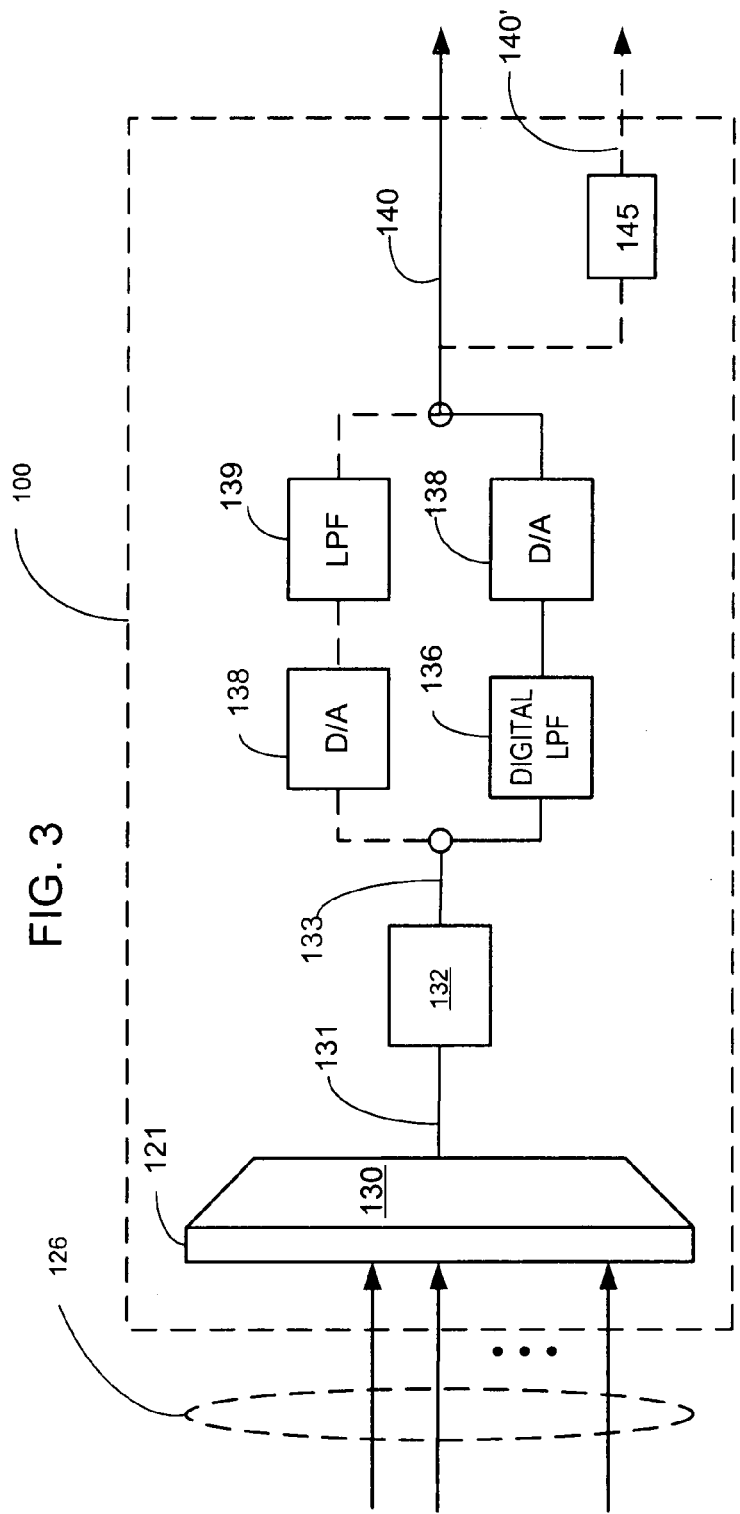
FIG. 3 is a functional diagram of the apparatus of FIG. 2.

An aspect of the present invention is an apparatus 100, which is generally referred to herein as an analog coder modulator, as is depicted in FIG. 2. The analog coder modulator 100 includes a plurality of digital data input ports 121 for simultaneously receiving a plurality of digital data signals 126 such as MPEG-2 compressed digital video data. The digital data input signals 126 may include digital signals compatible with the SMPTE-310 interface format having a data rate of approximately 19.39 million bits per second (mega-bits per seconds or Mb/s). Other digital data that may be accepted at the data input ports 121 of the modulator 100 includes two RS-232 channels and eight transistor transistor logic (TTL) logic inputs.

Another of the data input signals 126 is a signal compatible with the DVB-ASI (digital video broadcast-asynchronous serial interface) format. In addition, the data rate present at the DVB-ASI input may include any data rate from 1 Mb/s to 30 Mb/s. In accordance with this aspect of the present invention, the analog coder modulator 100 is able to automatically accept any of the data rates within the data range of 1 Mb/s to 30 Mb/s or higher. Typically, the data appearing on these inputs will be various forms of packet data. In accordance with an embodiment, null packets are multiplexed with the incoming data stream corresponding to the DVB-ASI input signal to maintain the internal data rate of the modulator. Such null packets include header information that distinguishes them from the data packets comprising the incoming DVB-ASI data stream. At the receive end, the null packets are removed and the original DVB-ASI signal is then reconstructed. The capability to automatically accept data rates from 1 Mb/s to 30 Mb/s provides end users with the versatility to transport a broad range of data rates.

In accordance with a further embodiment of the present invention, the analog coder modulator 100 is also able to automatically sense or detect either an SMPTE-310 or DVB-ASI signal. As such, the modulator is able to accept either two SMPTE-310 signals, two DVB-ASI signals or one of each such signal as input signals. This capability further increases the versatility of the modulator 100.

The analog coder modulator 100 further comprises a multiplexer 130 that combines the digital signals appearing at input ports 121 into a single transport stream. A forward error coder or corrector 132 then adds forward error correction to the transport stream so that errors in the data can be corrected at the receiver. The forward error correction may perform Reed Solomon and Trellis coding as well as an interleaving scheme that is used for 8-VSB (Vestigial Side Band) transmissions. In an embodiment, the forward error corrector 132 may comprise software implementing the Advanced Television Systems Committee (ATSC) forward error correction code methods as is described in ATSC Digital Television Standard documents A/53 and A/54.

The encoded stream is then filtered by digital low pass filter 136. In an embodiment, the low pass filter 136 includes a 3-dB cutoff of 6 mega-hertz. Other cutoff frequencies are also possible, including frequencies from 1 to 7 mega-hertz, depending on the data rates of the input signals on port 121. The filter 136 performs the function of limiting the pass-band for the digital signal that will be transmitted over an analog microwave link. By limiting the pass-band of the digital signals, the present invention allows additional signals, including analog sub-carrier signals to be transmitted along with these digital signals. In accordance with this aspect of the invention, analog microwave links can be used to carry high definition television signals. As such, the analog infrastructure of a broadcast network may be used to support high definition television services.

The band limited digital transport stream is then converted by analog baseband converter 138 into an analog baseband output signal 140 that is fully compatible with the input of an analog microwave transmitter. In an embodiment, the converter 138 uses the bandlimited transport stream to generate an amplitude modulated signal having an amplitude of one volt peak to peak (1 Vpp). This amplitude modulated signal is then fed directly into the baseband input of an analog microwave transmitter where the amplitude modulated signal frequency modulates the carrier generated by the microwave transmitter.

In a further variant the analog modulator 100 may alternatively include an analog filter 139 at the output of analog baseband converter 138 in lieu of digital filter 136. Filter 139 may comprise a lumped element low pass filter that functions to limit the transport stream below a predetermined frequency. In fact, the 3-db cutoff frequency set forth above for filter 136 could also be used, depending on the application, for filter 139.

As FIG. 1 also shows, the baseband output signal 140 may also serve as the input to an optional frequency modulator 145. In such an embodiment, the frequency modulator 145 may comprise an intermediate frequency heterodyne transmitter operating at 70 mega-hertz. Such frequency modulators are used for up-conversion to the desired microwave frequency. In accordance with this particular embodiment the output of the frequency modulator 145 is then coupled to a microwave transmitter.

FIG. 3 depicts a further alternative functional block diagram of the modulator 100 of FIG. 2. One or more input signals 126 enter the modulator 100 at input ports 121 and are passed on to multiplexer 130. Multiplexer 130 combines the input signals 121 into a transport stream 131 to which forward error coder 132 adds forward error correction information. The resultant coded signal 133 may then be further processed via one of two circuit paths. The signal 133 may enter digital low pass filter 136 and then be converted by digital to analog converter 138 into an analog signal 140 having the characteristics suitable for the input to an analog transmitter. Alternatively, the signal may enter digital to analog coder 138 to be converted to an analog signal and then filtered by analog filter 139, the resulting signal also being compatible with the input of an analog transmitter. In a further variant, signal 140 may be converted to signal 140' at a higher frequency.

In accordance with this aspect of the present invention, digital signals, including an HDTV signal, can be transmitted over an analog link along with audio sub-carrier signals. This increases the life of the analog equipment in the broadcast network and avoids the costs associated with replacing such equipment with digital equipment.

Figure 4A:
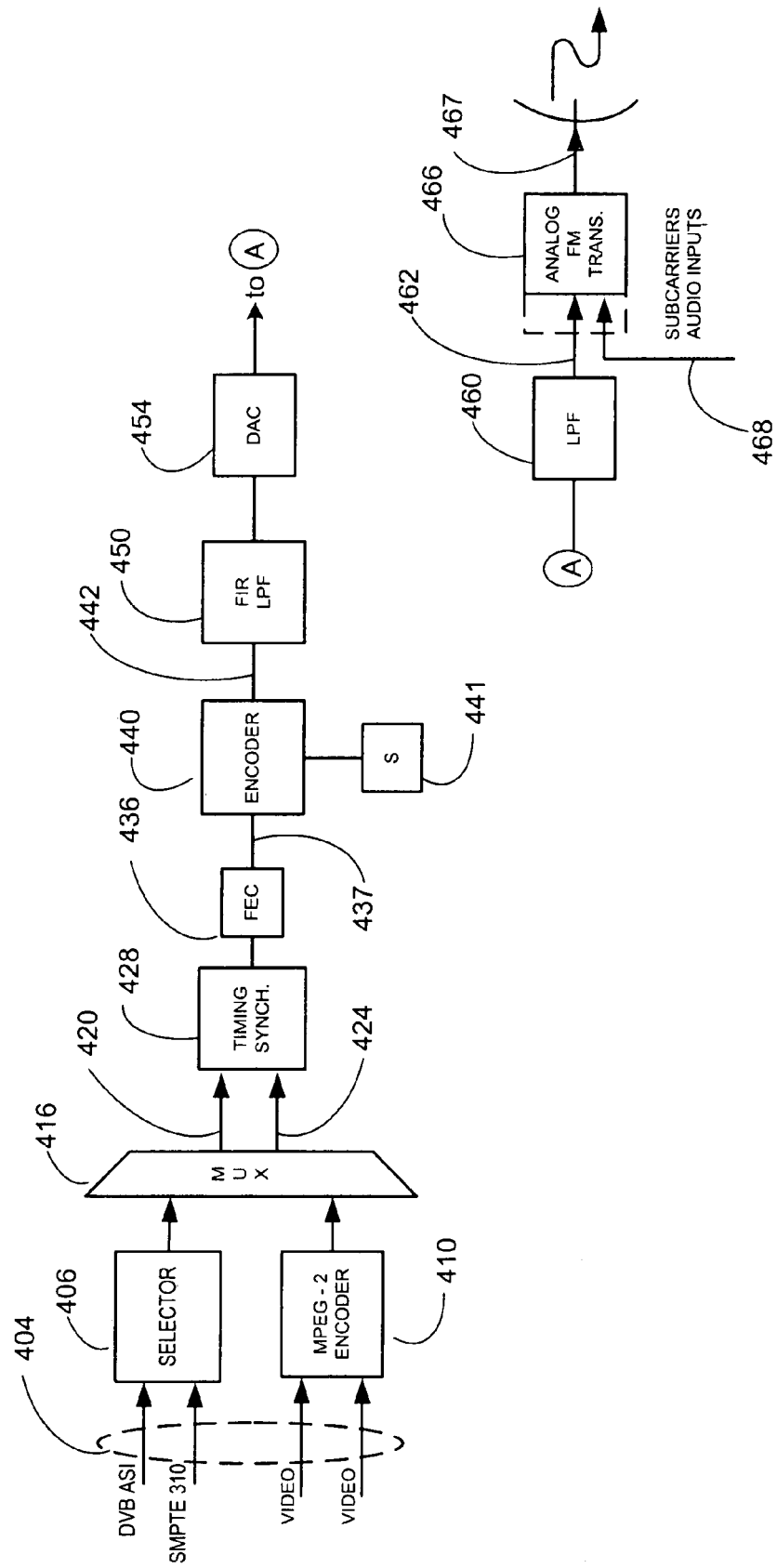
FIG. 4A illustratively depicts an apparatus in accordance with another aspect of the present invention.

Turning now to FIG. 4A, there is shown an apparatus 400 in accordance with another aspect of the present invention. The apparatus includes a plurality of input ports 404 for receiving a plurality of digital data signals as well as video and audio signals, e.g., high-definition video and AC-3 audio. These input digital data signals may include, for example, DVB-ASI or SMPTE-310 formatted signals as described hereinabove. HDTV or other encoded video data streams may be carried on the DVB-ASI and SMPTE-310 signals. The DVB-ASI and SMPTE-310 signals are fed into selector or switch 406, which allows for selection between either a DVB-ASI or SMPTE-310 signal. The video or audio data signals provided via input ports 404 are encoded by MPEG-2 encoder 410. Although an MPEG-2 encoder is shown, it should be understood that other video encoders operating in accordance with other coding formats, e.g., MPEG-4, may be employed in accordance with this aspect of the present invention. In addition, although the MPEG-2 encoder 410 is illustrated as being incorporated within the apparatus 400, an MPEG-2 encoded signal may alternatively be prepared outside the apparatus 400, and the MPEG-2 data stream provided as an input to the apparatus 400.

The signals from the selector 406 as well as the signals from MPEG-2 encoder 410 are fed to multiplexer 416. The multiplexer 416 is preferably a packet multiplexer which reformats the input data signals into a larger packet for further processing. The multiplexer 416 combines the data provided by selector 406 and MPEG-2 encoder 410 and provides the combined data stream 420 along with a clock signal 424 to a synchronization unit 428. The synchronization unit 428 then retimes and provides the data stream 420 to a forward error corrector (FEC) 436, which may add Reed-Solomon and/or Trellis coding to form an error corrected data stream 437.

The error corrected data stream 437 is then fed to a digital multilevel encoder 440, which produces a multilevel signal 442. The number of levels or symbols of the signal 442 depends on the number of bits in the error corrected data stream that are processed by the encoder 440. In particular, in accordance with the present invention, the encoder 440 can selectively process either one, two, three or four bits at a time based on a setting of user selectable switch 441. In this way, the encoder 440 creates a digital multi-level signal 442, which may selectively include 2, 4, 8 or 16 levels.

In accordance with an aspect of the present invention, a user may set user input switch 441 so that the signal 442 is formatted as a multilevel signal having 2, 4, 8 or 16 levels or symbols. The user input switch 441 may be a hardware device or implemented in software. By allowing for user selectability among these various formats a broadcast system may be engineered to meet the reach and data rate, i.e., performance, requirements of a user. For example, a lower data rate signal may be transmitted over a farther distance using the 2-level formatted signal as these signals are known to be more robust than a 4-level, 8-level or 16-level formatted signal. In contrast, where a higher data rate is required to be transmitted 8-level signal may be used, but the reach of system would be shorter, i.e., the distance would be less.

The multilevel signal 442 is then filtered by a digital low pass filter 450. Digital low pass filter 450 is preferably a finite impulse response (FIR) digital filter having a 3-dB cutoff of 6 mega-hertz. Other cutoff frequencies are also possible, including frequencies from 1 to 7 mega-hertz, depending on the data rates of the input signals on port 404. In general, the 3-db cutoff frequency of filter 450 is approximately set to ½ the symbol rate of the multilevel signal 442. The signal from the filter 450 is then converted to an analog signal by digital to analog converter 454. The analog signal 457 is then low-pass filtered by an analog filter 460, which preferably comprises lumped circuit elements. The 3-db cutoff of filter 460 is preferably 6 MHz.

The output from the filter 460 comprises an analog baseband output signal 462 that can be used to frequency modulate an analog FM radio transmitter 466 to produce an radio frequency output signal 467. As used herein, a baseband signal, whether analog or digital, is a signal that is used to modulate a radio transmitter. In addition, because the signal 462 is limited to a frequency band of less than 6 to 8 MHz, sub-carrier signals 468 used by broadcasters to transmit additional audio information, e.g., music channels, closed captioned text, control, maintenance or subtitles may be advantageously combined with the baseband output signal 462. The sub-carrier signals may be analog or digital signals. The combined signal may then be used to frequency modulate the carrier signal of the analog radio transmitter 466. In particular, by limiting the spectrum of the baseband signal in accordance with the present invention, the analog infrastructure can be used to transmit digital video signals, e.g., HDTV, along with the other information broadcasters and viewers have come to expect to be provided as part of a television broadcast service.

Figure 4B:
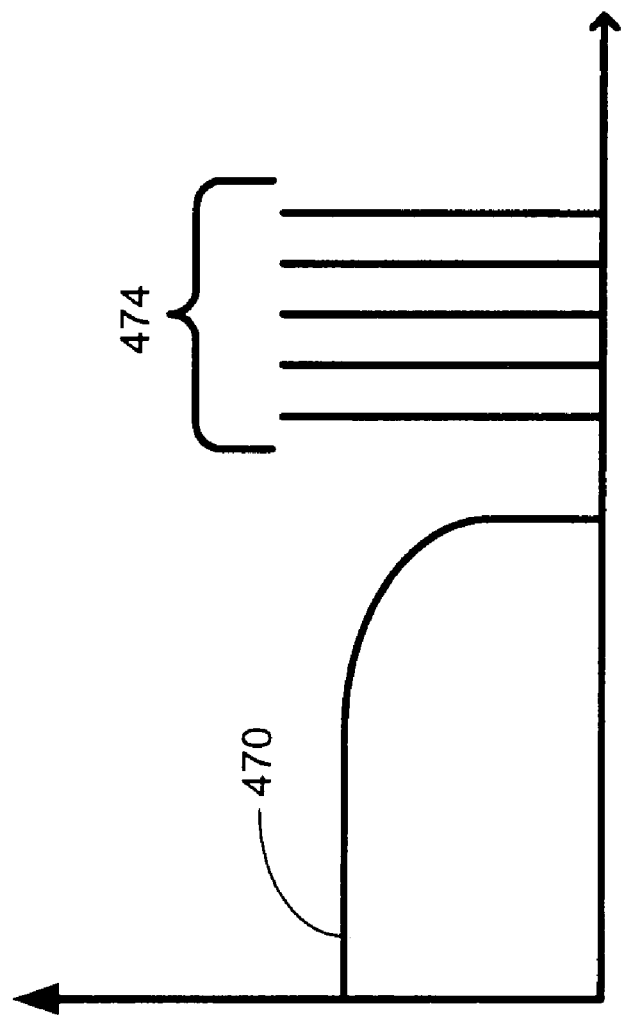
FIG. 4B illustratively depicts the spectrum of a signal processed in accordance with an aspect of the present invention.
Figure 4C:
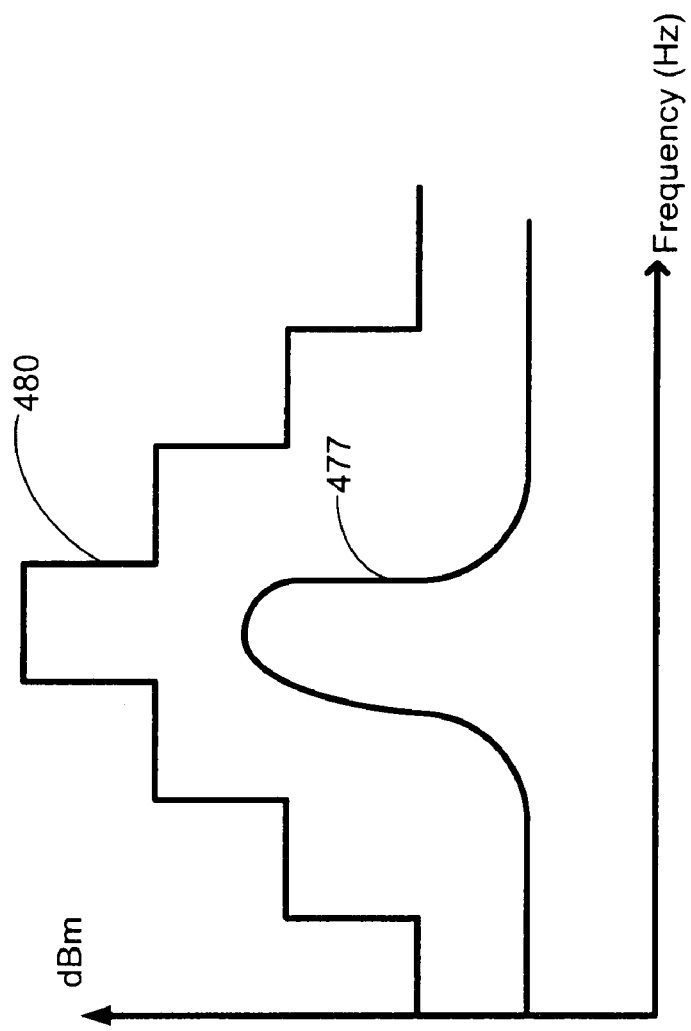
FIG. 4C illustratively depicts the RF output spectrum of a signal processed in accordance with an aspect of the present invention along with a spectral mask within which such signal is required to fit.

As best seen in FIG. 4B, the frequency spectrum 470 of the baseband output signal 462 occupies a frequency band below approximately 8 MHz. The sub-carrier input signals 474 may then occupy the band between 8 and 12 MHz. In this way, both digital video and subcarrier input signals can be transmitted within a 12 MHz bandwidth in accordance with the FCC's order of November 2003. In this regard, FIG. 4C illustratively depicts the RF output spectrum 477 of the RF signal 467 along with the spectral mask 480 within which such RF signals must fit. As FIG. 4C shows, the RF signal 467 meets the mask 480 requirement. As such, the useful life of existing analog broadcasting equipment may be extended even with the deployment of HDTV or other digital data services.

Figure 5A:
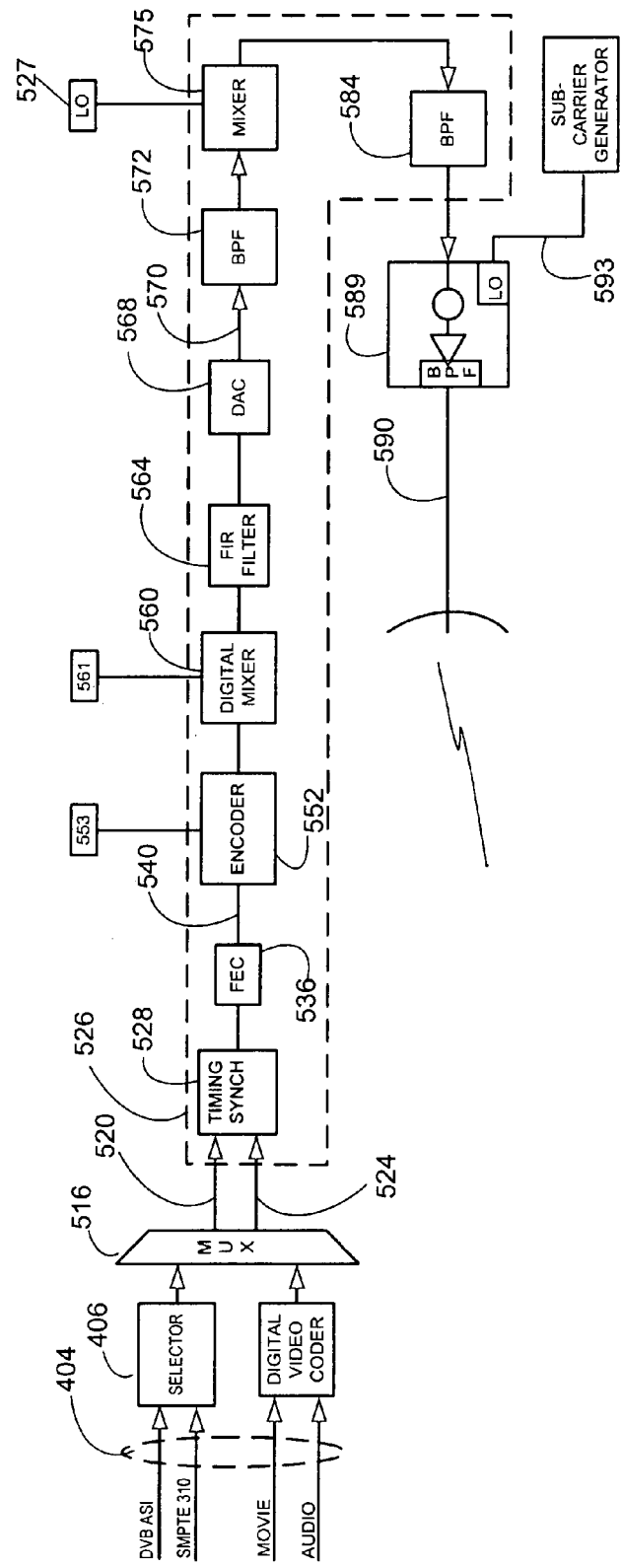
FIG. 5A illustratively depicts an apparatus in accordance with yet another aspect of the present invention.

FIG. 5A illustratively depicts an apparatus 500 in accordance with another aspect of the present invention. The apparatus 500 preferably includes a plurality of input ports 504 for receiving a plurality of digital data signals as well as video and audio signals, e.g., high-definition video and AC-3 audio. These input digital data signals may include, for example, DVB-ASI or SMPTE-310 formatted signals as described hereinabove. The DVB-ASI and SMPTE-310 signals are fed into selector or switch 506, which allows for selection between either a DVB-ASI or SMPTE-310 formatted signal. The video or audio data signals provided via input ports 504 are encoded by MPEG-2 encoder 510. Although an MPEG-2 encoder is shown, it should be understood that other video encoders operating in accordance with MPEG-4, wavelet encoding or other coding formats may be employed in accordance with this aspect of the present invention.

The signals from the selector 506 as well as the signals from MPEG-2 decoder 510 are fed to multiplexer 516. The multiplexer 516 is preferably a packet multiplexer that reformats the input data signals into a larger packet for further processing. In general, the multiplexer 516 combines the data provided by selector 506 and MPEG-2 decoder 510 and provides the combined data stream 520 along with a timing signal 524 to modulator block 526. In particular, the combined data stream 520 along with the timing signal 524 are provided to a synchronization unit 528. The synchronization unit 528 then retimes, reframes and provides the data stream 520 to a forward error corrector (FEC) 536, which may add Reed-Solomon or Trellis coding, to the combined data stream 520 along with a timing signal 524 or both, to from an error corrected data stream 540. The functions performed by the timing synchronization unit 528 and FEC 536 may be performed by commercially available Application Specific Integrated Circuits (ASICs), such as Zenith's ATSC Re-Modulator Chip 221-1413.

The error corrected data stream 540 is then processed by multilevel encoder 552 to form a multilevel data stream 555. The encoder 552 forms the multi-level data stream 555 by selecting a predetermined numbers of bits in the stream 555 and assigning a level or symbol corresponding to the bits. In this way, the encoder operates similarly to a byte and/or symbol processor used in VSB processing in assigning symbol or voltage levels based on whether one, two, three or four bits are processed at a time. The number of bits that are processed is user selectable at switch 553, which may be implemented as was described for switch 441. The multilevel signal is then fed to a digital mixer 560. Digital mixer 560 converts the multilevel signal into an RF VSB signal depending on the number of bits processed. For example, if one bit is processed at a time, a 2-VSB signal is formed at the output of digital mixer 560, whereas if two, three or four bits are processed at a time, a 4-VSB, 8-VSB or 16-VSB signal is formed. Thus, the oscillator 561 output frequency is selectable based on the settings of switch 553.

Figure 5B:
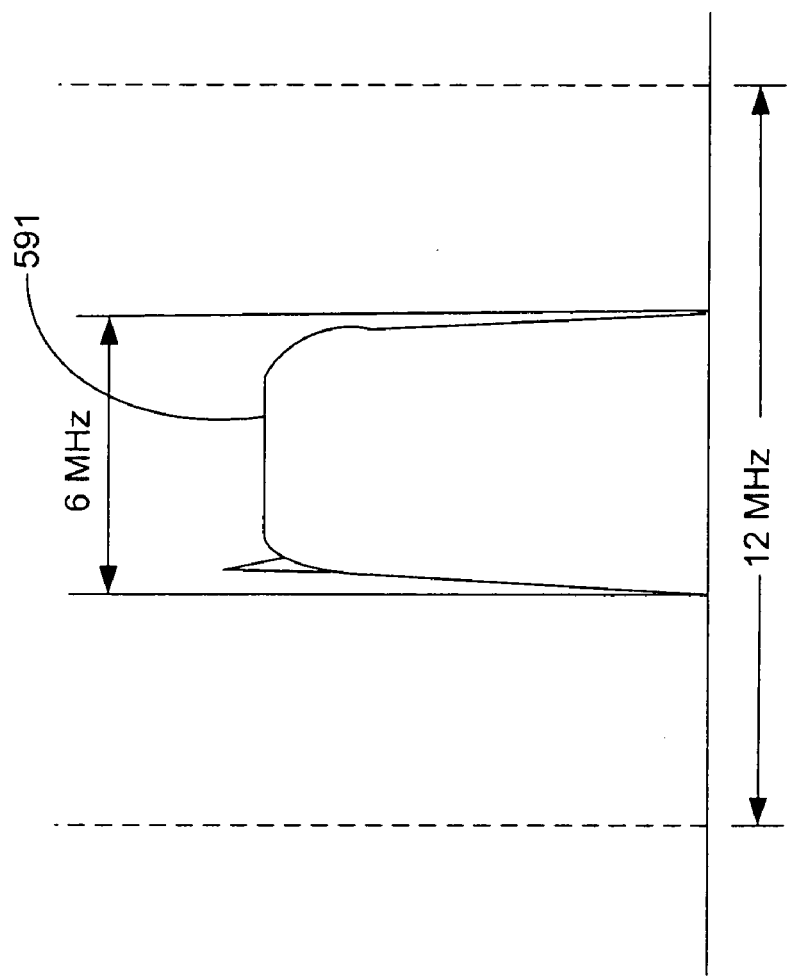
FIG. 5B is an illustrative plot of the spectrum of a signal prepared in accordance with the apparatus of FIG. 5A.

The signal from the digital mixer 560 is then filtered by FIR filter 564 and fed to digital to analog converter 568. FIR filter 564 is preferably a band-pass filter having a pass-band of typically 6 MHz. The signal 570 from the digital to analog converter 568 is then filtered by band-pass filter 572 and mixed in mixer 575 with a signal provided by local oscillator 577. The mixing operation performed by mixer 575 shifts the frequency of the signal 570 to an operating frequency of typically 66, 69 or 70 MHz as well as other frequencies in this range. The resulting signal 580 may then be further filtered by bandpass filter 584. The resulting IF output signal 587 is then fed to an RF up-converter 589 and transmitted as an RF signal 590. A representative spectral plot or spectrum 591 of the baseband output signal 587 is shown in FIGS. 5A and 5B. As FIG. 5C shows, the spectra of the IF output signal 587 occupies approximately 6 MHz of the 12 MHz channel that is available for transmission of broadcast signals.

In addition, because the IF output signal 587 occupies approximately 6 MHz of the 12 MHz channel prior to upconverting the baseband output signal, subcarrier signals 593 may be combined with the baseband output signal 587. Where these signals are combined with the baseband output signal, the resulting RF spectrum is as shown in FIG. 5C. In particular, the spectrum 595 of the subcarrier signals are located on either side of the spectrum 591 of the baseband output signal.

Therefore, as FIGS. 5B and 5C show, a VSB signal can be used to transmit digital data within the 12 MHz bandwidth recently allocated by the FCC for the broadcast of ENG-type applications. Moreover, in accordance with this aspect of the present invention, subcarrier signals can be broadcasted along with the digital data. As such, this aspect of the present invention advantageously allows for the use of VSB signals to be used in ENG applications in lieu of the COFDM format. Depending on the data rates that need to be transmitted, the user may select a 2-VSB, 4-VSB, 8-VSB or 16-VSB formatted signal for transmitting the data. As Table 2 shows, even a signal formatted in accordance with the 2-VSB format can transport up to 9.7 Mb/s, which is greater than the 5.5 Mb/s that most current COFDM modulated ENG systems obtain. Moreover, by using the 2-VSB format, the data can be transmitted over a greater distance because of the lower receive threshold at the receiver.

Figure 6:
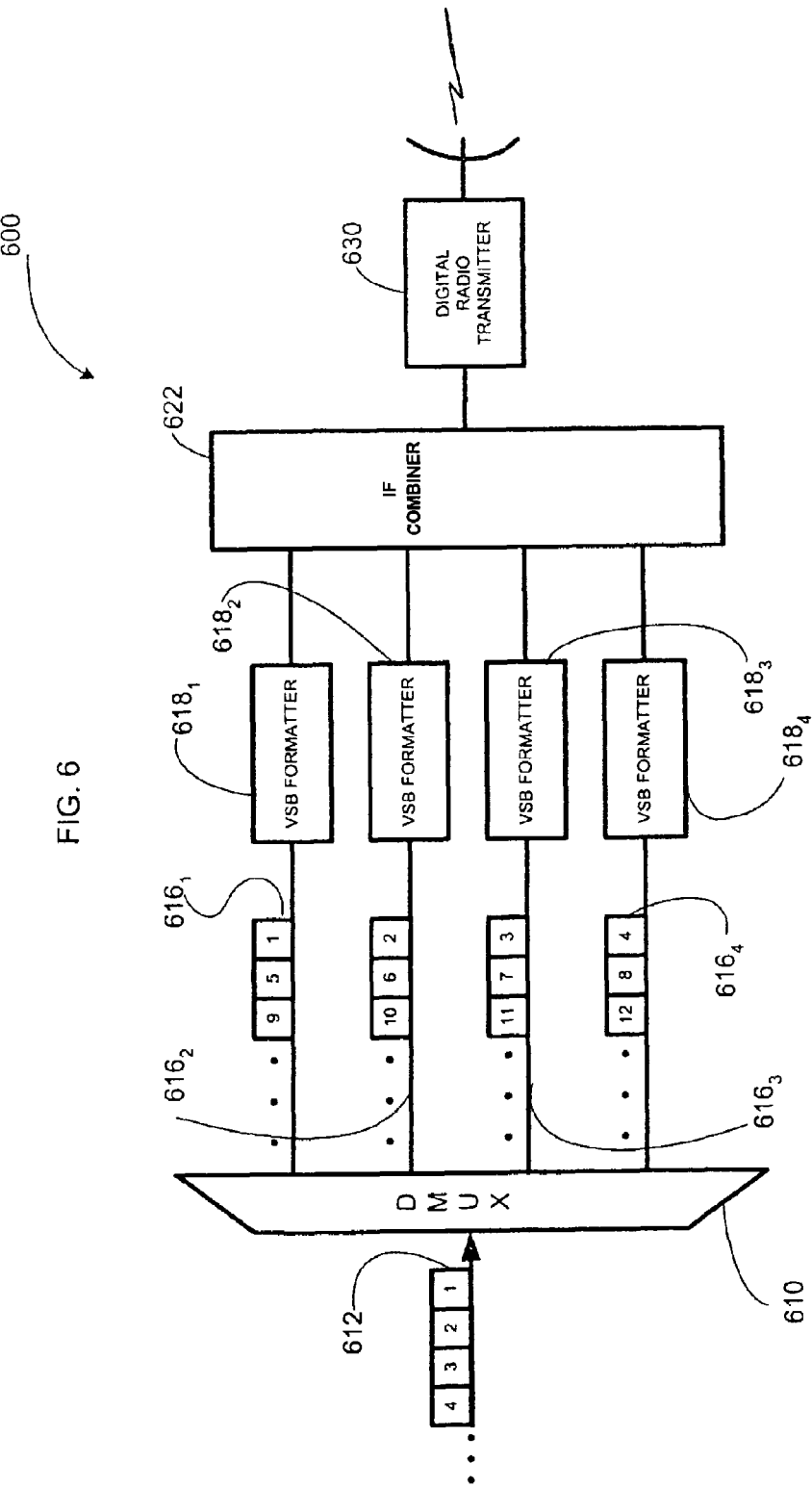
FIG. 6 is a system in accordance with another aspect of the present invention.

Turning now to FIG. 6, there is shown a system 600 for transmitting a high data rate stream in a broadcast system. The system comprises a demultiplexer 610 that accepts a high data rate stream 612, e.g., a 45 Mb/s MPEG-2 video stream, and demultiplexes or segments the data packets that make up the video stream onto four separate data paths 616. For example, packets 1, 5, 9, 13 etc. may be demultiplexed onto data path 616₁, packets 2, 6, 10, 14 may be demultiplexed onto data path 616₂. Additional data packets may be demultiplexed onto additional data paths 616₃ and 616₄ as shown in FIG. 6. In addition, as the number of paths increases beyond the four data paths shown in FIG. 6, the packets making up the video stream may be demultiplexed in a similar fashion.

The packets on each data path 616 are fed to respective VSB formatters 618. Each VSB formatter may be implemented in accordance with the functions performed by modulator 526 of FIG. 5A. In addition, each VSB formatter may also be implemented by commercially available VSB modulators such as Zenith's ATSC Re-Modulator Chip 221-1413. Each VSB formatter 618 then outputs a VSB formatted IF signal at a different intermediate frequency. For example, each VSB formatter may be set to produce a signal in accordance with the 8-VSB format but a slightly different IF frequency. As indicated in Table 2, the standard input data rate for an 8-VSB formatter is approximately 29 Mb/s. In addition, the frequency spectrum of an 8-VSB signal occupies a 6 MHz bandwidth. In accordance with this aspect of the present invention, because the input data rate to each 8-VSB formatter is reduced to approximately 11.25 Mb/s (assuming an input video stream at a rate of 45 Mb/s) by demultiplexer 610, the spectrum of the signal produced by each VSB formatter 618 will occupy approximately less than a 3 MHz bandwidth. That is, a reduction in the input data rate of a signal to the VSB formatter results in a proportional reduction in the frequency spectrum occupied by the signal. Thus, by appropriately selecting or adjusting the frequency from each of the VSB formatters, up to four 8-VSB signals may be transmitted simultaneously in a 12 MHz channel after being combined by IF combiner 622 to produce a combined signal 625 and transmitted by digital radio transmitter 630. IF combiner 622 may be, for example, a power combiner.

Figure 7:
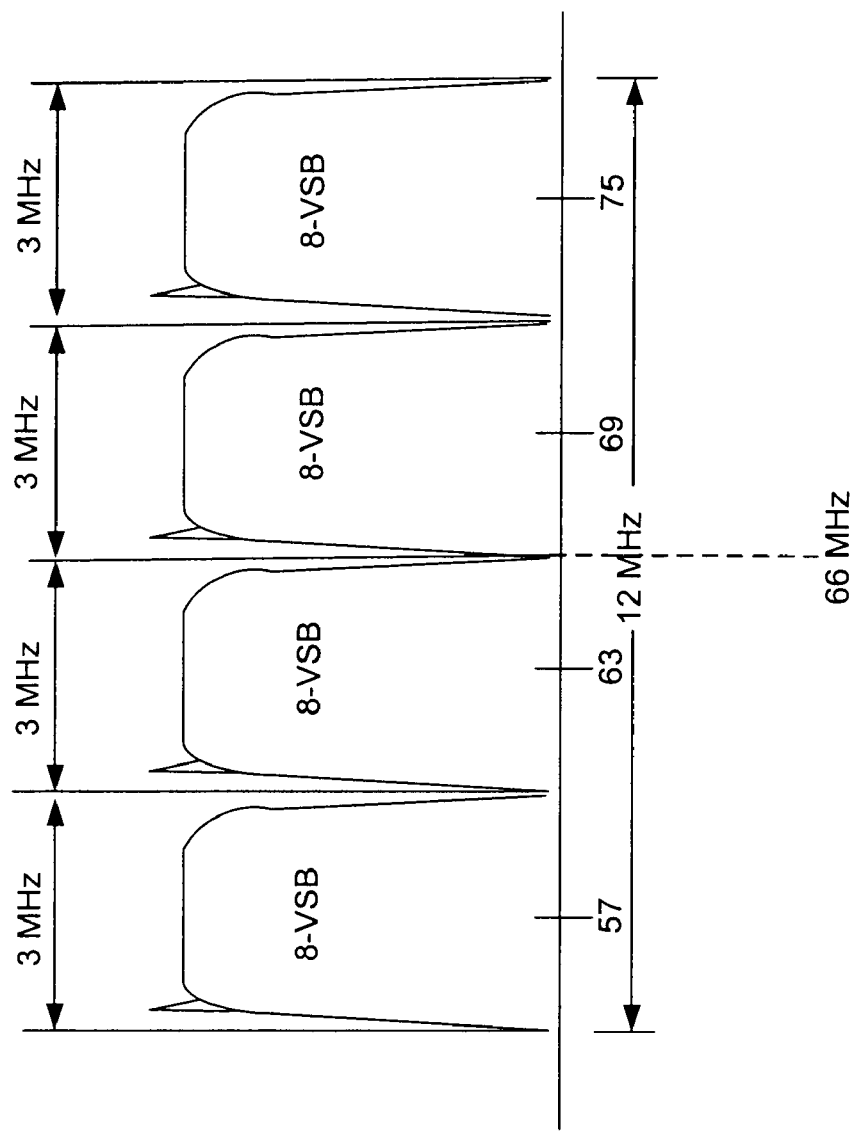
FIG. 7 is an illustrative plot of the spectrum of a signal prepared in accordance with the system of FIG. 6.

In particular and as best seen in FIG. 7, four 8-VSB signals having a data rate of up to approximately 14.5 Mb/s may be transmitted within the 12 MHz channel. In particular, if the center frequency of the 12 MHz channel is assumed to be 66 MHz, then the combined signal 625 may be distributed as is shown in FIG. 7.

Returning to FIG. 6, in accordance with a further aspect of the present invention, the VSB formatters 618 may be chosen based on the particular system design and performance requirements. In particular, if the VSB formatters are set to operate in a 4-VSB mode, the video stream 612 may be transmitted over a greater distance.

Figure 8:
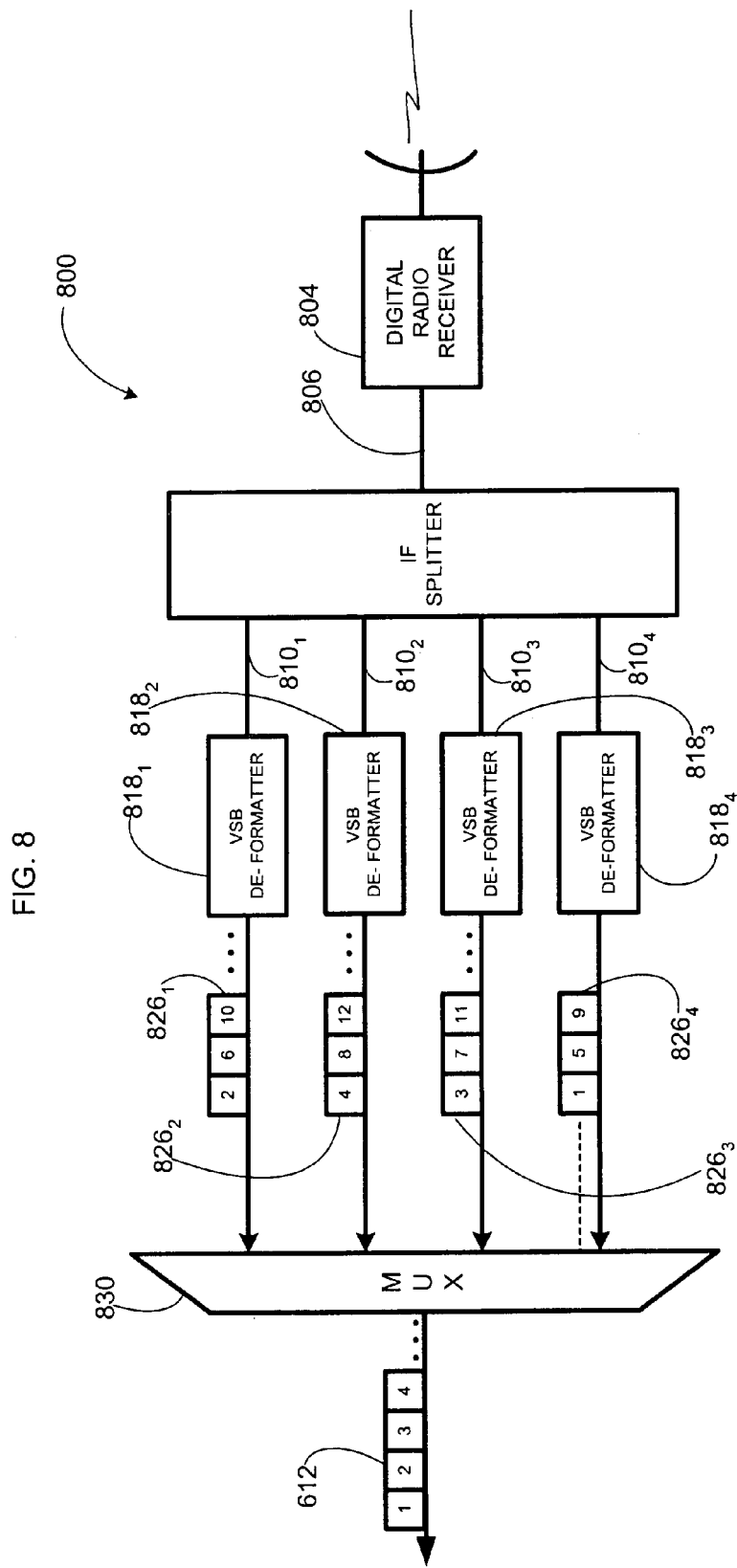
FIG. 8 is a system for receiving a signal prepared by the system of FIG. 6.

Turning now to FIG. 8, there is shown a system 800 for receiving a signal processed and transmitted in accordance with the system 600 of FIG. 6. The system 800 includes a digital radio receiver 804, which demodulates the RF signal transmitted by digital radio transmitter to a signal such as that shown in FIG. 7. The demodulated signal 806 is then split by IF splitter 808 with each split signal 810₁, 810₂, 810₃ and 810₄ being fed to a respective VSB reformatter 818, which reformats the signals into the constituent data packets 826₁, 826₂, 826₃ and 826₄ which are then multiplexed by multiplexer 830 into the original video data stream 612.

Figure 9:
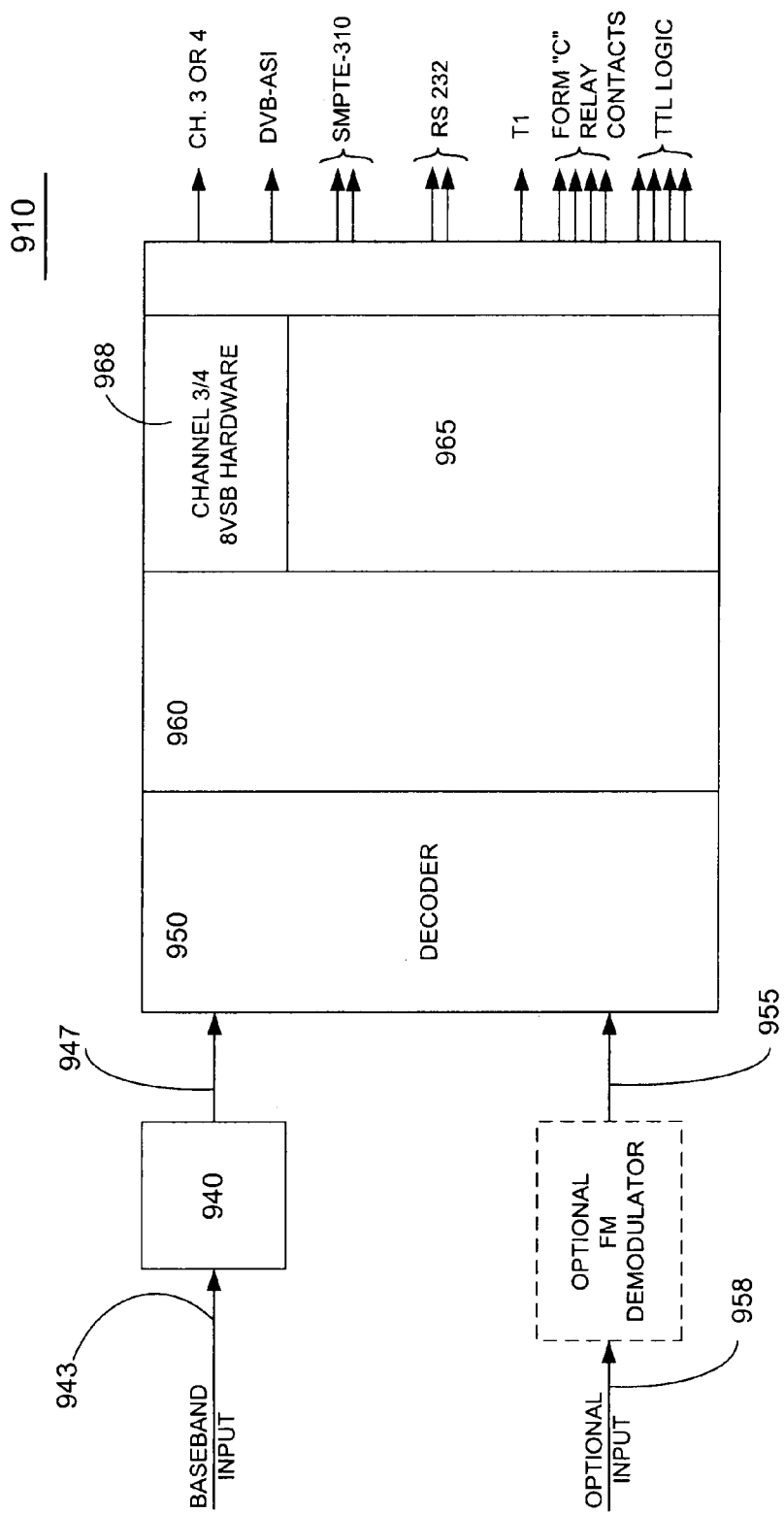
FIG. 9 depicts an illustrative embodiment of an analog coder demodulator in accordance with an additional aspect of the present invention.

Turning now to FIG. 9, there is shown an analog coder demodulator 910 in accordance with an additional aspect of the present invention. The demodulator 910 preferably includes intermediate frequency up-converter 940 which converts a baseband signal 943 to an RF output signal 947. The RF output signal 947 is directly inputted to a decoder 950. Alternatively, the output 955 of heterodyne frequency demodulator 958 may be directly inputted into the decoder 950. The decoder 950 recovers the encoded digital information from the coded analog baseband signal. The output of the decoder is then corrected for errors and equalized at block 960. In an embodiment, decoder 950 is an ATSC decoder. The latest series of professional ATSC receiver/demodulator chips can demodulate an RF output signal to reproduce the original transport data stream. By converting to an ATSC format, the full advantage of the latest ATSC technology in forward-error-correction and dynamic adaptive equalization technology is available to be utilized.

The demodulated ATSC transport stream is de-multiplexed at block 965 to simultaneously produce the original signals at output ports 968. In the embodiment depicted in FIG. 9 the de-multiplexed signals include: two ATSC SMPTE-310 at 19.39 Mb/s; one DVB-ASI at 1 to 30 Mb/s or SMPTE-310 at 19.39 Mb/s; two RS-232 channels; four logic and/or relay outputs; and an 8-VSB RF signal VHF channel 3 or 4. The RS-232 ports supply signals that provide a view of operational parameters. Two identical and isolated SMPTE-310 outputs are provided to feed redundant HDTV exciters. The DVB-ASI output, which is simultaneously provided, can be internally switched to produce a third SMPTE-310 output for continuous or occasional system monitoring. The four logic outputs and the four relay closures, as controlled at the modulator, are available for remote control of a variety of equipment such as transmitter parameters, tower lights, ENG or satellite receivers and associated antennas, antenna positioning, polarization, pan and tilt and pressurization.

To further utilize the 19.39 Mb/s ATSC signal at the demodulator, an 8-VSB re-modulator that produces an 8-VSB RF output at VHF channel 3 or 4 has been incorporated. A standard set top box, or a professional grade decoder, can be used to provide the recovered video and audio in a variety of ways. For example, the actual video and audio signal transported over the microwave link can be viewed prior to being fed to the HDTV transmitter. Since the original 19.39 Mb/s signal is unaltered, both HD and SD formats are available from the set top box or professional grade decoder.

Figure 10:
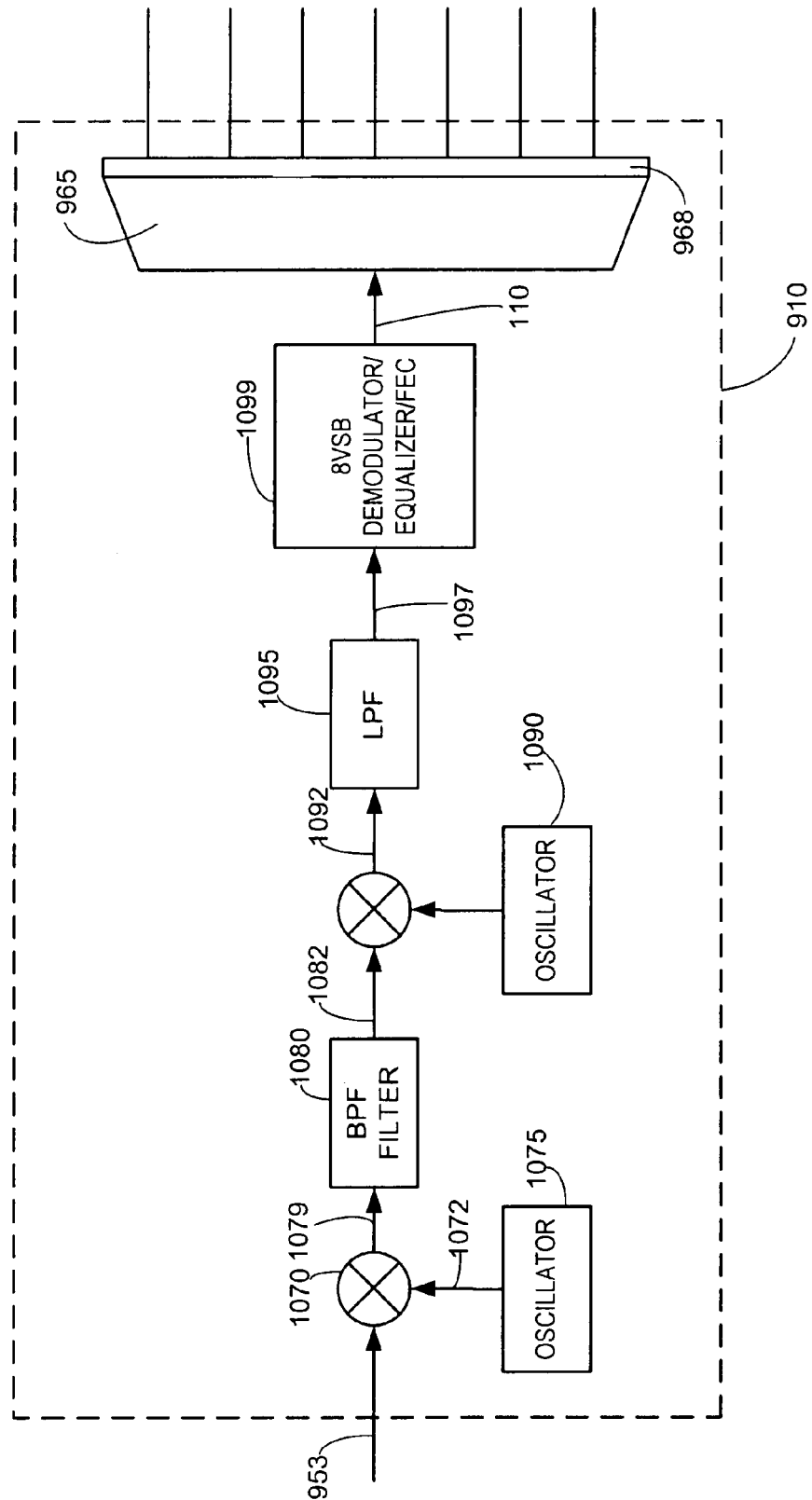
FIG. 10 depicts an illustrative embodiment of the analog coder demodulator of FIG. 9.

FIG. 10 depicts an illustrative embodiment of the analog coder demodulator 910 of FIG. 9. In accordance with this embodiment, the baseband signal 953 from an analog microwave receiver enters one port of a first mixer 1070. A signal 1072 is fed from oscillator 1075 into the other port of mixer 1070. The signal 1072 may be a double sideband 8-VSB radio frequency signal having a frequency of approximately 70 or 140 MHz. The frequency of oscillator 1075 depends on the signal 953. The signal 1079 out of the mixer 1070 depends on the frequency of oscillator 1075 and can be a 70 or 140 MHz 8-VSB radio frequency signal. The signal 1079 is then filtered by band-pass filter 1080, which may comprise a surface acoustic wave (SAW) filter. The filter 1080 is used to remove one side of the double-sided 8-VSB signal. The filtered signal 1082 is routed through a second mixer 1085, where it is mixed with a signal from oscillator 1090. The signal from the oscillator 1090 is approximately 6 MHz less than the frequency of oscillator 1075. The resultant signal 1092 after the second mixing process is a 6 MHz 8-VSB radio frequency signal. This signal is then fed to low pass filter 1095, which for this particular embodiment comprises a low pass filter having a 3-dB cutoff frequency of 12 mega-hertz. The signal 1097 from the low pass filter is then fed to an 8-VSB demodulator chip 1099. Chip 1099 then recovers the digital transport stream by demodulating and equalizing the signal 1097 and performing error correction based on the ATSC FEC code inserted at the transmit end. The signal 1100 from the chip 1099 is then demultiplexed into its constituents, including a HDTV signal.

The embodiment of FIG. 10 is particularly advantageous in that it allows the demodulator 910 to be designed using off the shelf 8-VSB components or chip sets. In this way, the cost of analog coder demodulator 910 is reduced as these components or chip sets are readily available and inexpensive because the 8 VSB signal is transmitted to HDTV set top boxes in a user's home.

Figure 11:
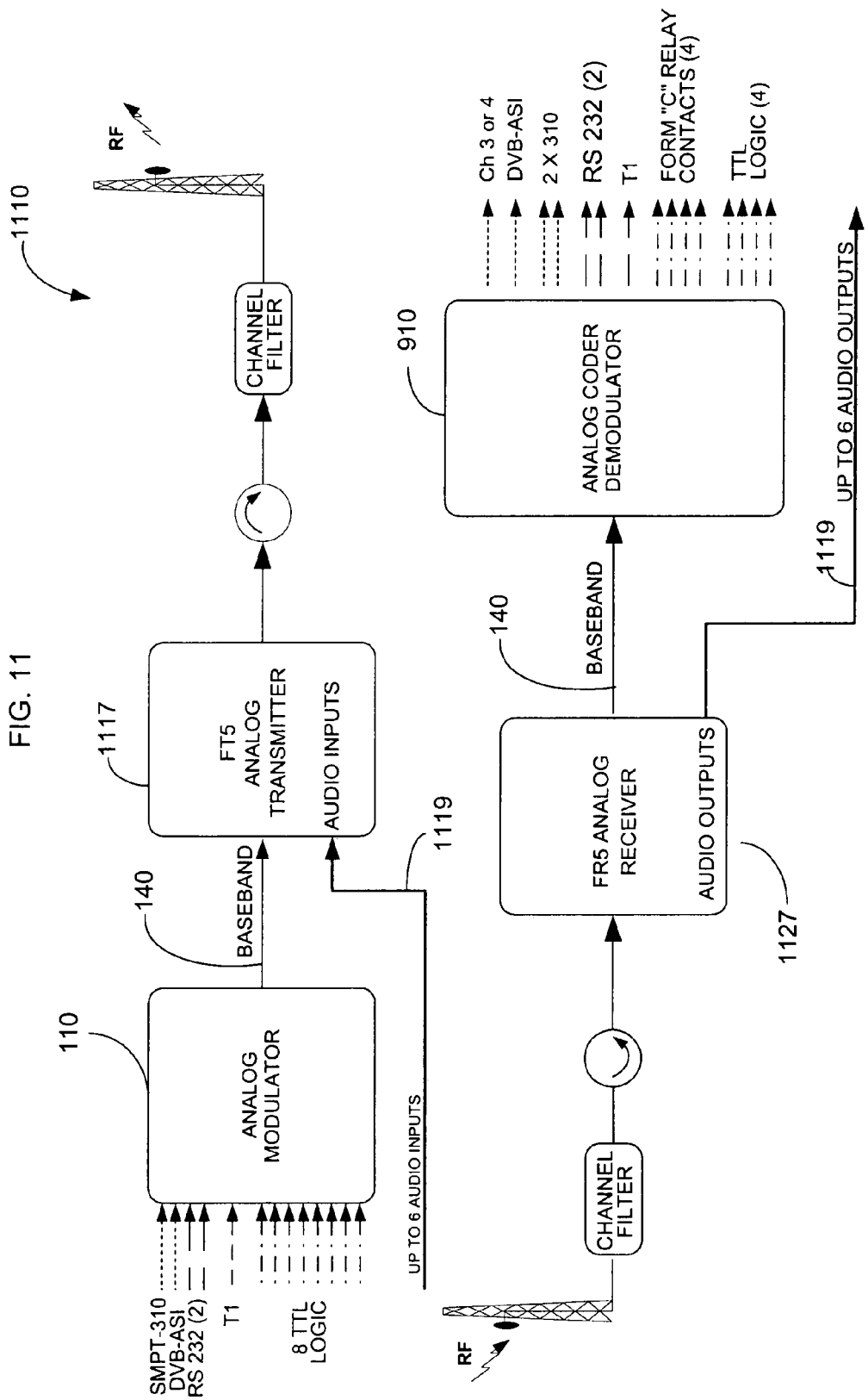
FIG. 11 depicts an illustrative application in accordance with the present invention.

As previously discussed, the present invention allows the analog infrastructure of a broadcast network to support the provision of HDTV and other digital data services. FIG. 11 shows a first illustrative embodiment 1110 of the analog modulator 110 and demodulator 910 supporting the provision of these services. In accordance with this embodiment, the analog modulator 110 outputs a baseband signal 140 that is compatible with the analog microwave transmitter 1117. In addition, one or more additional input signals 1119 are inputted to the microwave transmitter 1117. The one or more input signals 1119 may comprise up to six analog or digital audio sub-carrier signals. In accordance with this embodiment, as long as the subcarrier frequencies are above the cutoff frequency of the filter 136 of the modulator 110 (see FIG. 2), then these signals can be recovered by the analog receiver 1127. In accordance with the present embodiment, the one or more audio signals 1119 are recovered along with the baseband signal 140. The baseband signal is then processed by the analog demodulator 910 in accordance with FIG. 9.

Figure 12:
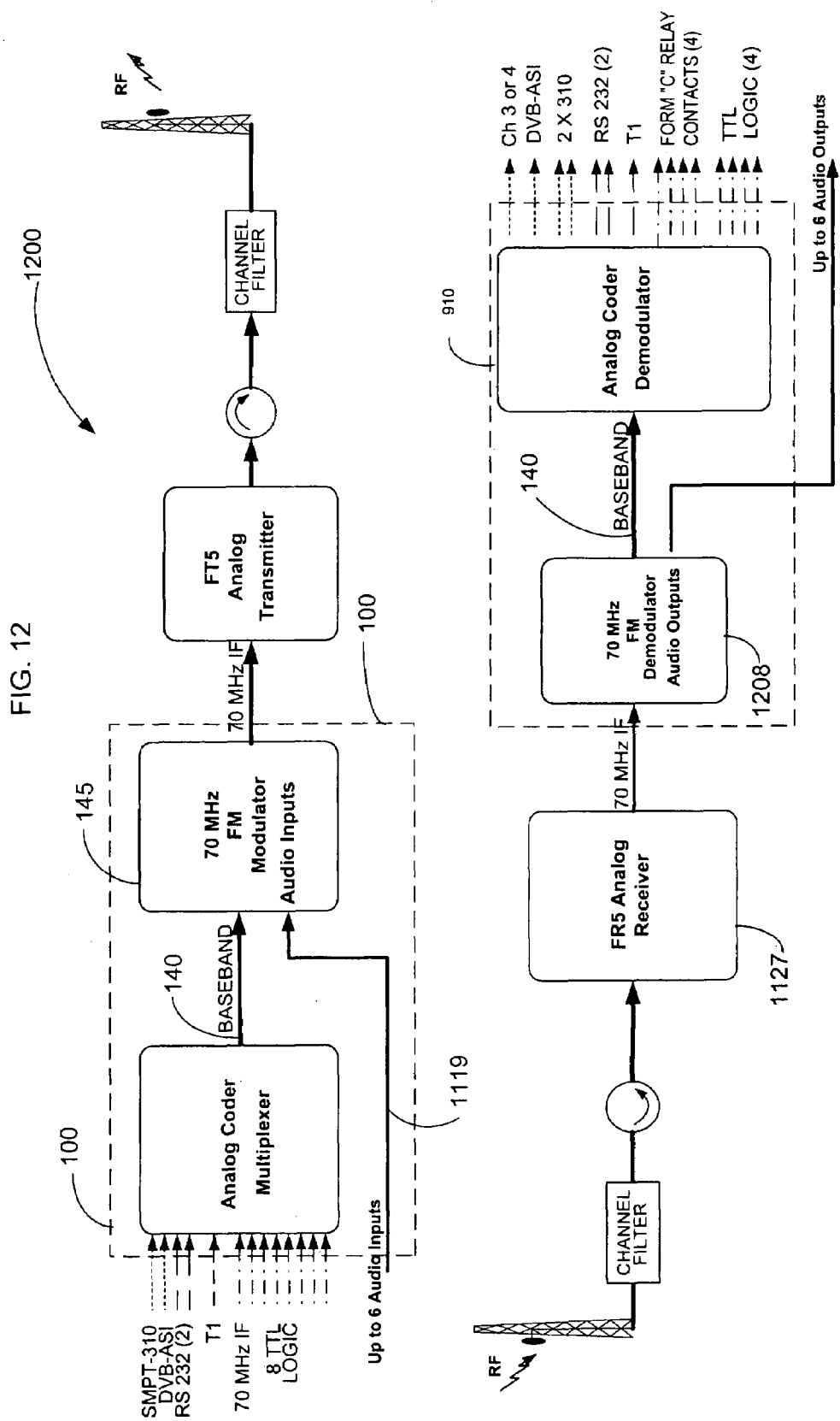
FIG. 12 depicts a variant of the illustrative application shown in FIG. 11.

FIG. 12 depicts a variant to the application of FIG. 11 in that a 70 mega-hertz frequency modulator is positioned between the modulator 100 and accepts both the baseband signal 140 and the audio signals 1119. On the receive side a 70 mega-hertz FM demodulator 1208 demodulates the signal received from the microwave receiver outputting the baseband signal 140 along with the audio signals 1119.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

The invention claimed is:

1. A method for transmitting a digital signal over a microwave link, comprising:
    demultiplexing a digital data stream into a plurality of lower data rate streams;
    modulating each of said demultiplexed lower data rate streams to produce a plurality of vestigial side band VSB signal streams;
    combining each of said VSB signal streams to form a combined intermediate frequency signal; and
    transmitting said combined intermediate frequency signal over the microwave link.

2. The method of claim 1 wherein said modulating comprises modulating each of said demultiplexed lower data rate streams to produce a VSB signal consistent with a format selected from the group consisting of a 2-VSB format, a 4-VSB format, a 8-VSB format and a 16 VSB format.

3. The method of claim 1 wherein said demultiplexing comprises separating the digital data stream into the plurality of lower data rate streams such that each lower data rate stream comprises a stream of packetized data.

4. The method of claim 1 wherein said modulating includes generating each of the plurality of VSB signal streams at a different predetermined frequency.

5. An apparatus for transmitting a digital signal over a microwave link, comprising:
    a demultiplexer having an input and a plurality of outputs;
    a plurality of VSB modulators, each of said vestigial side band VSB modulators having an input coupled to a respective one of said demultiplexer outputs and an output;
    an intermediate frequency combiner for combining each of said VSB modulator outputs into a transport stream; and
    a digital microwave radio for transmitting said transport stream over the microwave link.

6. The apparatus of claim 5 wherein each of said plurality of VSB modulators comprise a switch for selecting a multi-level signal having a format selected from the group consisting of a 2-VSB format, a 4-VSB format, a 8-VSB format and a 16 VSB format.

7. The apparatus of claim 5 wherein said demultiplexer is a packet demultiplexer.

8. The apparatus of claim 5 wherein each of said VSB modulator outputs generates a VSB signal at a different predetermined frequency.

* * * * *

UNITED STATES PATENT AND TRADEMARK OFFICE
CERTIFICATE OF CORRECTION

| | |
|---|---|
| PATENT NO. | : 7,471,733 B1 |
| APPLICATION NO. | : 11/888626 |
| DATED | : December 30, 2008 |
| INVENTOR(S) | : John B. Payne, III and John B. Payne, IV |

Page 1 of 1

It is certified that error appears in the above-identified patent and that said Letters Patent is hereby corrected as shown below:

Column 14, line 22, "VSB" should read --(VSB)--.
Column 14, line 43, "VSB" should read --Vestigal Side Band (VSB)--.
Column 14, line 44, "VSB" should read --(VSB)--.

Signed and Sealed this

Twenty-seventh Day of April, 2010

David J. Kappos
*Director of the United States Patent and Trademark Office*